July 26, 1949. H. S. BLOCH 2,477,038
HYDROGEN FLUORIDE SLUDGE DECOMPOSITION PROCESS
Filed Dec. 28, 1945 2 Sheets-Sheet 1
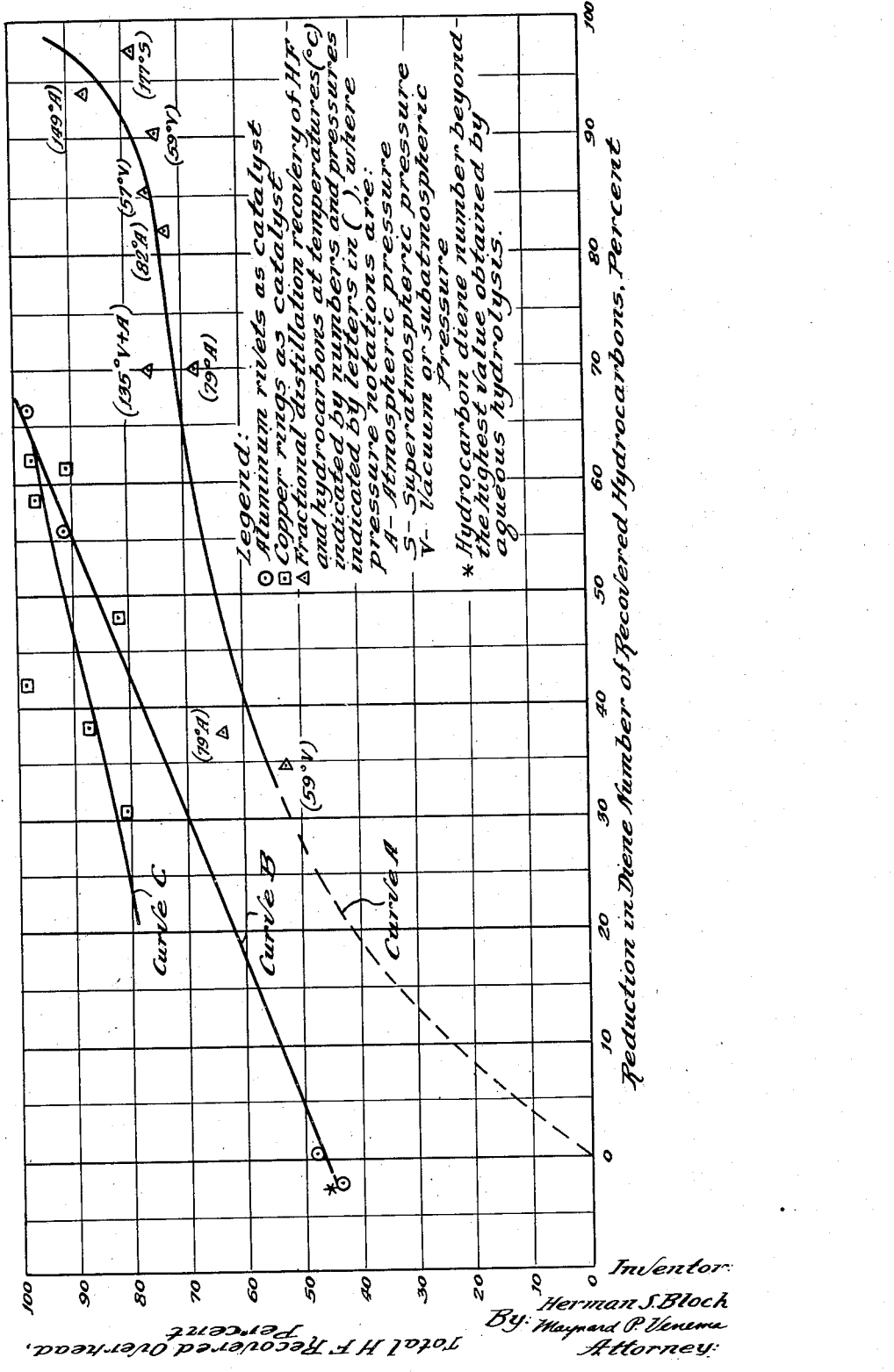

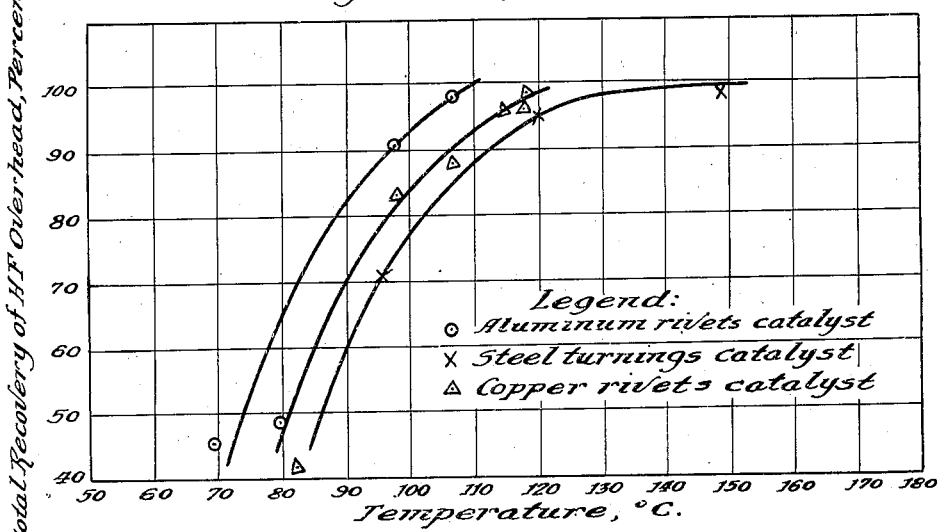
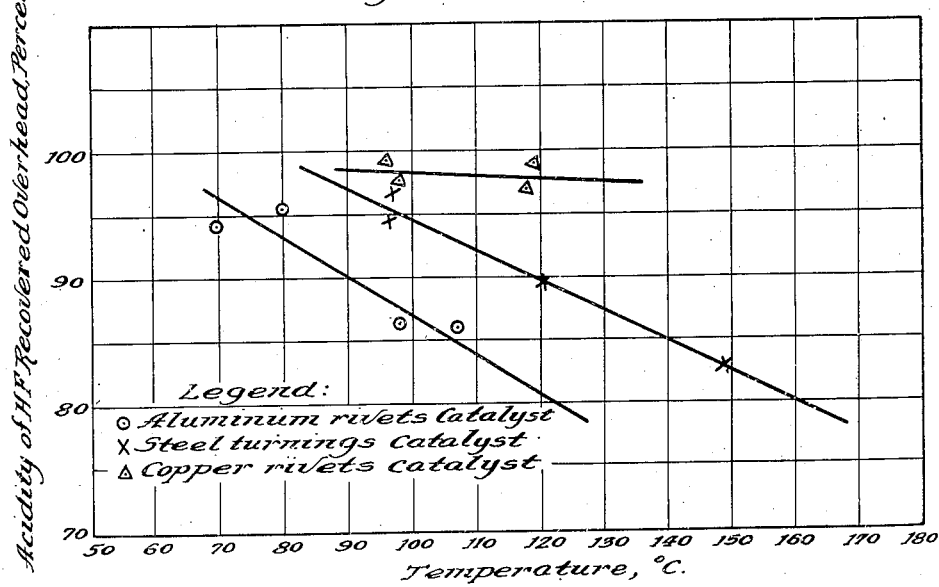

Patented July 26, 1949

2,477,038

UNITED STATES PATENT OFFICE 2,477,038

HYDROGEN FLUORIDE SLUDGE DECOMPOSITION PROCESS

Herman S. Bloch, Chicago, Ill., assignor to Universal Oil Products Company, Chicago, Ill., a corporation of Delaware Application December 28, 1945, Serial No. 637,619

7 Claims. (Cl. 23—153)

The present invention relates to the production of valuable hydrocarbons containing conjugated and non-conjugated unsaturation of the type utilizable as drying oils. More specifically this invention relates to a process for decomposing hydrogen fluoride sludges in which catalytic substances and a particular type of product recovery operation are employed to effect said decomposition with a minimum production of polymeric and deteriorated products.

The hydrocarbon-hydrogen fluoride complex referred to as a "hydrogen fluoride sludge" in the specification and claims of the present application relates to a reaction product obtained by contacting substantially anhydrous hydrogen fluoride with various hydrocarbons under certain reaction conditions as hereinafter specified. In the reactions wherein such sludges are formed, the hydrogen fluoride is believed to act not only catalytically in causing the condensation of the hydrocarbons, but is also believed to effect polymerization and hydrogen transfer between the hydrocarbons contained in the mixture. Evidence indicates, too, that a portion of the hydrogen fluoride combines loosely with certain hydrocarbons contained in the mixture to form the hydrocarbon-hydrogen fluoride complex or sludge herein mentioned. In any event the hydrocarbons recovered from the sludge are found to contain a greater number of carbon atoms per molecule and a lower hydrogen to carbon ratio than the original hydrocarbons charged.

The chief object of this invention concerns the recovery of valuable unsaturated hydrocarbons from a sludge formed by contacting a suitable hydrocarbon with hydrogen fluoride, said process being further characterized in that polymerization and deterioration of said unsaturated hydrocarbons separated during the recovery stage are reduced to a minimum and the unsaturated character of said hydrocarbons, particularly the conjugated unsaturation thereof is for the most part preserved.

It is another object of this invention to provide a process for recovering hydrogen fluoride from sludges produced by contacting substantially anhydrous hydrogen fluoride with hydrocarbons of specified type, said process being characterized in that said hydrogen fluoride is recovered in a highly concentrated condition suitable for recycling without further treatment to the initial contacting stage of the process.

It is still another object of my invention to provide catalytic agents which will accelerate the decomposition of hydrogen fluoride sludges and in consequence reduce the contact period of the unsaturated hydrocarbons released by said decomposition with the free hydrogen fluoride in the system, thereby reducing undesirable polymerization and deterioration of said unsaturated hydrocarbons.

In one embodiment my invention comprises catalytically decomposing at certain optimum conditions of temperature and pressure a sludge obtained by contacting an olefinic polymer gasoline fraction having a boiling point within the range of from about 35° to about 225° C. with substantially anhydrous hydrogen fluoride followed by separating an acidic sludge from the reaction products thereof, by-passing said sludge at a temperature of from about 30° to about 150° C. into a flashing column packed with a contacting material which acts catalytically in decomposing the hydrogen fluoride - hydrocarbon complex compounds contained in said sludge, withdrawing a fraction from the light ends portion of said flashing column containing substantially anhydrous hydrogen fluoride and removing a fraction from the heavy ends portion of said flashing column containing a highly unsaturated polyolefinic hydrocarbon mixture rich in olefins having conjugated as well as non-conjugated unsaturation.

A specific embodiment of my invention relates to a hydrogen fluoride sludge decomposition process and catalyst therefore, said process comprising the flash distillation of said hydrogen fluoride sludge in the presence of said catalyst selected from those substances which are inert to the continuous action of hydrogen fluoride, such as structural carbon of the non-activated type and especially catalytic metals such as lead, cobalt, copper, and alloys of copper, such as brass.

Other embodiments of this invention relate to specific methods of operating the process, conditions of operation, and to specific catalysts utilizable in the present process and further discussed in the following description of the invention.

The effect of various conditions on the process is shown in curves of the three figures of the accompanying drawing. These figures will be hereinafter specifically discussed.

The types of compounds which yield desirable sludges most readily, in general, are the aliphatic and the cyclic, non-aromatic hydrocarbons, that is, the straight and branched chain or cyclic olefinic and paraffinic hydrocarbons. Of the above general groups of hydrocarbons utilizable in the preparation of the sludge, the highly branched paraffins containing at least four carbon atoms per molecule, and the straight or branched chain mono- or polyolefins or acetylenes, as well as cyclic olefins are preferred starting materials, since these hydrocarbons form sludges which when treated according to the present process yield a product composed chiefly of high molecular weight hydrocarbons which are highly unsaturated and which contain olefinic bonds in conjugated relation to one another. The charging stock to the sludge-forming reaction may comprise simply a single hydrocarbon component of suitable structure, but if a mixture of hydrocarbons is more available, the starting material may contain a number of hydrocarbons of diverse structure, no substantial portion of which is of aromatic character. I have found that it is desirable to maintain as low an aromatic content in the feed as possible, because the yield of desirable polyolefins is lowered in direct proportion to the aromatic content of the feed stock. A readily obtainable source of hydrocarbon mixtures which I have found to be especially suitable in the formation of a hydrogen fluoride sludge are certain fractions of cracked or polymer gasoline (preferably the latter) having a boiling range of from about 30° to about 225° C. If a cracked gasoline is selected as the charging stock, it is desirably fractionated to separate a portion low in aromatic content, or is given a prior extraction treatment to remove aromatic hydrocarbons therefrom.

A hydrogen fluoride sludge which I have found to be a suitable starting material for the process of this invention is the sludge formed in hydrogen fluoride-catalyzed alkylation processes wherein substantially anhydrous hydrogen fluoride is contacted with a mixture of olefinic and paraffinic hydrocarbons to cause condensation of said hydrocarbons. The sludge in this case is a by-product material unavoidably formed in the process from which only the hydrogen fluoride has heretofore been recovered in useful form because no completely satisfactory and economical method has been devised for separating the hydrocarbons from the sludge without considerably changing their properties, although it has been realized for some time that the hydrocarbons contained in the alkylation sludge possess valuable properties by virtue of their unsaturation and particularly their conjugated unsaturation.

Processes which are presently known or used for the recovery of hydrogen fluoride and hydrocarbons from hydrogen fluoride sludges involve numerous problems, and the products recovered are in many respects unsuitable or too costly for the use intended of them.

One process which has been proposed is the so-called "aqueous hydrolysis" method wherein the sludge is thoroughly mixed with water in which is dissolved a base or an acid, if desired, to assist in the hydrolyzing action. The resultant two-phase mixture is separated into an aqueous phase containing highly diluted spent hydrogen fluoride or the fluoride salts of the base and a hydrocarbon phase which is removed from the mixture as the useful product. From the standpoint of economy, however, the hydrogen fluoride is sufficiently costly to require recovery, and the recovery process must be operated so that it is obtained from the process in nearly an anhydrous condition suitable for recycling to the initial contacting or sludge-forming stage. The recovery of anhydrous hydrogen fluoride from an aqueous solution, as is well-known to those familiar with the art, is an operation of considerable complexity, involving fractionation in acid-resistant equipment, said equipment usually being fabricated from alloys containing nickel, copper, and steel which are of known and well-recognized high cost. The equipment used for the sludge hydrolysis would likewise have to be of such materials.

Another process of the prior art employed for recovering hydrogen fluoride sludge by-products is based upon the thermal decomposition of said sludges, accompanied by fractionation to separate the hydrocarbons contained in the sludge from the hydrogen fluoride. I have observed in duplicating the technique and conditions of such an operation and in comparing the products obtained by that method with the products obtained by the process of this invention, that the hydrocarbon products of the thermal method undergo a drastic change of structure, wherein they are converted from materials originally valuable and useful for many purposes to products which are at most of only limited utility and of deteriorated and inferior quality. The unsaturated hydrocarbons combined with the hydrogen fluoride as the sludge when released as free hydrocarbons are by their very nature subject to deterioration at the decomposition conditions, especially since they are in contact with free hydrogen fluoride also released by the decomposition. The unsaturation of these hydrocarbons, which is partly conjugated and partly non-conjugated in character, makes them particularly susceptible to polymerization or condensation, particularly in the presence of hydrogen fluoride which is known to be a catalyst for polymerizing unsaturated hydrocarbons under the conditions employed in the thermal decomposition processes. The contact period between the hydrocarbons and hydrogen fluoride is not only increased while the sludge is held in the distillation flask or pot, but in fractionating the vapors, a continuous reflux of the condensed vapors, necessary for effecting the separation of the two components, prolongs the contact period further. As a result, the hydrocarbons are condensed to dark, high-boiling tars containing little olefinic unsaturation, either conjugated or non-conjugated.

According to the method of decomposing hydrogen fluoride sludges embodied in this invention, the highly unsaturated hydrocarbons and free hydrogen fluoride are recovered in a single step operation by flash distillation of the sludge in the presence of a catalyst at relatively mild pressure and temperature conditions. The separation of the sludge components is effected in such manner as to take advantage of very short contact periods between the hydrogen fluoride and the hydrocarbons released in the decomposition, low temperatures, and the accelerating effect of a catalyst. These factors and conditions, in combination, substantially eliminates the condensation and polymerization of the hydrocarbons (so evident in the thermal decomposition method) and yields a hydrogen fluoride of high purity.

In preparing the starting material for the process of this invention (that is, the hydrogen fluoride sludge), a single hydrocarbon or mixture of hydrocarbons of the hereinbefore mentioned preferred types are contacted for a period of time generally not exceeding about two hours with approximately anhydrous hydrogen fluoride, preferably of about 95 to about 99+% concentration, at a temperature within the range of from about −20° to about 200° C. (preferably from about 30° to about 125° C.) and at a superatmospheric pressure sufficient to maintain the reactants in liquid phase during the reaction. Usually, after about ½ hour, the reaction is substantially complete and the reactants separate into two liquid phases on standing, an upper hydrocarbon layer which may comprise a valuable gasoline by-product, depending upon the charging stock employed, and a lower acid phase containing most of the hydrogen fluoride charged to the reaction. Said acid phase, usually a mobile, brown colored fluid is the so-called "hydrogen fluoride sludge" employed in the present invention. Although the sludge employed in the present process need not necessarily be derived from an alkylation process as a by-product thereof, according to the above description, said commercial hydrogen fluoride alkylation sludge does constitute a convenient source of the starting material for utilization in the present process, especially when olefinic and branched chain paraffinic hydrocarbons are employed in the alkylation reaction.

The hydrogen fluoride sludge as separated from the sludge-forming reaction zone contains some free hydrogen fluoride and a small quantity of alkyl fluorides besides the complex of said unsaturated hydrocarbons with hydrogen fluoride. If the sludge is decomposed thermally according to prior art techniques, polymerization or condensation with consequent reduction in the unsaturation of the hydrocarbons contained therein, especially a reduction in the number of conjugated double bonds in the hydrocarbon molecules invariably results. The effect of thermal decomposition and the attendant high temperatures and refluxing effects upon the unsaturated qualities of the recovered hydrocarbons is shown in curve A of Figure 1, where the per cent reduction in diene number of the recovered hydrocarbons (the measure of their conjugated unsaturation) is plotted against the per cent of the total hydrogen fluoride recovered overhead, or the per cent of total sludge decomposition. The curve indicates that as the percentage of hydrogen fluoride recovered is increased, the diene number of the recovered hydrocarbons decreases, approaching zero (or 100% reduction) as 100% recovery of hydrogen fluoride is obtained. The lower portions of curve A have been extrapolated to zero per cent reduction, no results being available for that region. The reduction in the unsaturation of the recovered hydrocarbons is a particularly undesirable feature of the thermal decomposition method, since it is the unsaturated properties of these hydrocarbons which gives them their value as drying oils and for utilization in the synthesis of various organic compounds and commercial products derivable from such hydrocarbons.

In the present method of this invention for sludge decomposition, a catalyst is utilized which has the ability to release the unsaturated hydrocarbons from combination with hydrogen fluoride in said sludge at a lower temperature, with greater speed and with more efficiency than by the strictly thermal decomposition method. The present method permits an immediate separation of the hydrocarbons and hydrogen fluoride following the liberation of these components from the sludge, thus substantially eliminating the contact period between the unsaturated hydrocarbons and the free hydrogen fluoride in the reactor and obviating a major factor causing the polymerization of the hydrocarbons. I believe that the catalyst serves a further purpose in that its surface also inhibits polymerization and condensation of the hydrocarbons released in the decomposition.

According to the present process, a hydrogen fluoride sludge is charged at a suitable temperature into a packed flashing column containing as a packing material a catalytic agent of the class herein specified. According to one method of operation, the sludge just prior to being charged into the packed tower is heated to a temperature of from about 50° to about 200° C., depending upon whether atmospheric pressure or a pressure above or below atmospheric is employed in said catalyst-packed tower. Preferably, the sludge is heated at a pressure slightly above that maintained in the packed column which may be operated at a pressure ranging from subatmospheric (i. e. at about 350 mm. mercury absolute pressure) to about 50 pounds per square inch pressure. I have found that a particularly desirable arrangement for conducting the present process is to heat the sludge to a temperature of about 125° C. at slightly above atmospheric pressure immediately before it enters the packed column while maintaining said column at about atmospheric pressure. The hydrogen fluoride released by contact of the sludge with the catalyst in the catalytic flashing tower may then be compressed and condensed with relative ease. Alternatively, the decomposition may be carried out at a pressure sufficiently above atmospheric so that the liberated hydrogen fluoride may be condensed with ordinary cooling water without further compression.

During the catalytic decomposition of the sludge or prior to its introduction into the flashing column containing the catalyst, it may be mixed with a non-reactive diluent, usually a saturated hydrocarbon such as a paraffin containing from about 4 to about 10 carbon atoms per molecule. The hydrocarbon diluent has the effect of reducing polymerization of the unsaturated hydrocarbons released in the decomposition by physically dispersing the unsaturated hydrocarbon molecules into an inert medium. The diluent, condensing with the desired product may be subsequently removed from the mixture by distillation and may be recycled to the catalytic decomposition column, if desired. Other methods of operating the process may, of course, be employed and I do not wish to be limited to the methods and conditions referred to above as the preferred means of operation.

As operated by the above series of steps, the process results in the separation of a hydrogen fluoride effluent removed from the top of the packed column containing from about 90 to over 99% hydrogen fluoride. As a bottoms product or residue from the column, an unsaturated hydrocarbon fraction is removed which contains hydrocarbons having a high degree of conjugated and non-conjugated unsaturation comprising the other desired product of this process.

Instead of a single step operation as outlined, the catalytic flash decomposition may be operated employing two or more columns in series which are packed with the catalytic agent. I have found in a number of typical experiments that the amount of hydrogen fluoride recovered overhead from the column varies directly with the temperature at which the column operates, so that, for example, with a packing of single-turn steel helices and at a feed rate of about six to eight pounds of sludge per gallon of packing per hour, about 77% of the total hydrogen fluoride recoverable is flashed off at 100° C., while at about 148° C. the overhead recovery of hydrogen fluoride is 98% of the total. These relationships for three representative catalysts are shown in the accompanying Figure 2. With many packing materials, on the other hand, the acidity of the recovered hydrogen fluoride varies inversely with the temperature of the column; that is, the amount of hydrocarbons flashed overhead with the hydrogen fluoride increases directly with the temperature, as shown in accompanying Figure 3. Under the conditions described above, for example, at 100° C., the acidity is high, that is, about 95%, while at about 140° C., the acidity of the hydrogen fluoride is only about 85%. By using a two-stage flashing operation, in which the first catalytic flashing tower is operated at a higher temperature than the second, I have found that it is possible to obtain a high recovery of hydrogen fluoride having high acidity with no depletion of the quality of the recovered hydrocarbons. A multiple-stage flashing operation may thus have particular advantage under some conditions and with some catalysts over a single-stage operation.

The sludge may be heated or cooled prior to its introduction into the flashig column containing the sludge decomposition catalyst. If the sludge is brought to the optimum temperature for decomposition prior to its contact with the catalyst, the column does not under these conditions require external heating, and may be operated as an adiabatic reactor. It may be heated however, if for example, the rate of throughput causes an undesirably large temperature drop in the tower. According to another method of operation, the sludge is introduced cold or at ambient temperatures into a heated fractionating column, maintained at the optimum temperature for decomposition by thermostatic control.

The catalysts utilizable in the present process for decomposition of hydrogen fluoride sludges broadly comprise those substances which are solid at the temperatures specified for the operation of the process and which are substantially inert to the continued action of free hydrogen fluoride. In addition to these properties the catalytic packing material should possess the following physical and chemical properties: (1) it should be capable of accelerating the decomposition of the hydrogen fluoride-hydrocarbon complexes contained in the sludge; (2) it should not catalyze, but should rather inhibit, the condensation or polymerization of the unsaturated hydrocarbons liberated in the sludge decomposition; and (3) it should not catalyze or promote cracking of the liberated hydrocarbons into short chain length molecules. Generally speaking, the requirement that the catalyst be inert to the continued action of hydrogen fluoride eliminates such materials as silica-containing substances and metals which are readily attacked by anhydrous hydrogen fluoride, especially those metals high in the electromotive series of elements. Metals which may be eliminated from consideration because of melting point or continued reactivity with hydrogen fluoride include principally the alkali and alkaline earth metals, other than magnesium. Magnesium, the above exception, appears to be resistant to hydrogen fluoride in contrast to the other metals which are high in the electromotive series, presumably because of the coating of oxide normally present on its surface or because of a coating of fluoride or oxyfluoride formed during the reaction which prevents further attack on the metal. Thus, some metals which show an initial reactivity toward hydrogen fluoride develop on continued exposure to the reagent a special inertness, designated herein as "inertness to the continuous action of hydrogen fluoride."

All other metals melting above the temperature at which the present process is operated may be classified in one of three general groups. Group A metals, although desirable from the standpoint of having excellent catalytic properties in accelerating the decomposition of the hydrogen fluoride sludge and in retarding the polymerization and condensation of the liberated sludge hydrocarbons, nevertheless also display a tendency to crack the hydrocarbons and display relatively little resistance to the continued action of hydrogen fluoride. Group B metals have excellent corrosion resistance and do not crack the liberated hydrocarbons, but possess relatively poorer catalytic properties in so far as accelerating the decomposition of the hydrogen fluoride sludge and in preventing the polymerization and condensation of the liberated hydrocarbons. Group C metals possess properties intermediate between the extreme exemplified by the metals of groups A and B, and some individual members possess properties varying from poor to excellent in respect to their catalytic activity in promoting the sludge decomposition reaction and the condensation and polymerization effects. Metals belonging to group A, above, comprise tin, lead, aluminum, chromium and zinc. Group B metals comprise nickel, iron, silver, and antimony, while copper, cobalt, magnesium, bismuth, tungsten and cadmium are among the group C metals. Copper, one of the preferred members of the above groups, apparently possesses a high degree of catalytic activity in accelerating the decomposition of the sludge, and retarding the pyrolysis (cracking) of the liberated hydrocarbons, and also displays a relatively high degree of activity in inhibiting the polymerization and condensation of the desired hydrocarbon product. Thus, the products recovered from the flash decomposition of a hydrogen fluoride sludge in the presence of metallic copper as catalyst are generally in a highly desirable condition; the percentage recovery and concentration of hydrogen fluoride is high, the recovery of hydrocarbons approaches a maximum and the hydrocarbons retain a large percentage of their conjugated and non-conjugated unsaturation. Other metals from the above general list which possess exceptionally desirable catalytic properties and which are, in general, the preferred members include cobalt (which resulted in the formation of a hydrocarbon product having an unusually high diene number and a high recovery of the hydrogen fluoride product having a high acidity), cadmium (which resulted in a good product recovery of somewhat poorer quality than in the case of cobalt), lead (which effected the formation of an especially excellent hydrocarbon product), and tin.

Aluminum when tested as the decomposition catalyst under the same temperature and pressure conditions as was employed with other packing catalysts, gave a high recovery of hydrogen fluoride and unsaturated hydrocarbons having a relatively large number of conjugated double bonds, but it also exhibited a tendency to crack the hydrocarbons contained in the sludge, thus resulting in the deposition of coke during the course of the decomposition and forming, at the same time, low boiling hydrocarbons which flashed overhead with the hydrogen fluoride. At lower temperatures than those used with other catalysts, however, aluminum was more satisfactory as a packing material. Although not necessarily limited in its applicability, aluminum may have a specialized role in the recovery of the hydrogen fluoride from the sludge produced in hydrogen fluoride alkylation processes where the recovery of unsaturated hydrocarbons contained in the sludge may be of secondary importance to the recovery of the hydrogen fluoride.

Certain forms of carbon have also been found to exert a catalytic effect on the decomposition of hydrogen fluoride sludges, and in general, these forms include the non-activated calcined varieties of carbon which are usually at least partially graphitic in form and are of low surface area, referred to in the trades as "structural" carbon. Activated carbons are not generally preferred because of their known tendency to polymerize unsaturated hydrocarbons—an effect which is recognized as having deleterious results on the quality of the present product.

It is also within the scope of the present invention to utilize those oxides, oxyfluorides, or fluorides of the above metals which conform to the limitations discussed above for the metals. These compounds may be used in the form of a superficial layer of said metal compound on the surface of the metal particle. The desirable catalytic properties of one or more metals from the above groups may furthermore be combined in the form of an alloy of said metals. An alloy, for example, of a metal from group C with a metal from group A, such as brass containing copper, zinc and lead combines the desirable catalytic properties of copper for accelerating the sludge decomposition reaction and its inertness toward hydrogen fluoride with the properties of lead which retards the condensation and polymerization effects even more effectively than copper. Brass alloys containing from about 50 to about 75 per cent copper, 20 to about 40 per cent zinc and from about 0.25 to about 10 per cent of lead or tin have been found to be very effective catalysts for the decomposition reaction in that said catalysts permit the recovery of high yields of unsaturated hydrocarbons containing a large degree of conjugated unsaturation and the recovery of substantially all of the hydrogen fluoride contained in the sludge in a highly purified condition.

The unsaturated hydrocarbon fraction recovered from the hydrogen fluoride sludge and separated in the catalyst-packed column as a high boiling bottoms product according to the present process contains a series of high molecular weight cyclic compounds of wide boiling range, but of generally homologous structure which contain conjugated olefinic double bonds, although the exact composition of the fraction will vary somewhat depending upon the particular charging stock, the catalyst utilized in the decomposition, and the conditions of operation employed. Infra-red and ultra-violet adsorption studies as well as other analytical data determined on the unsaturated hydrocarbon material have shown that the polyenes contained therein are of cyclic structure but are substantially non-aromatic, and have isolated unsaturation in addition to the conjugated unsaturation, and that the four carbon atoms which constitute the conjugated system in said hydrocarbons are highly substituted, possessing, on the average, fewer than two hydrogen atoms per mol as substituents. Diolefin units of this nature may be represented by the general formula:

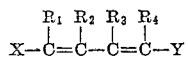

in which X and Y represent other parts of the cyclic polyolefinic molecule and $R_1$, $R_2$, $R_3$ and $R_4$ represent substituents such as hydrogen, an alkyl group, an alkenyl group, a cycloparaffin group, a cycloolefin group, etc.

Representative unsaturated polyolefinic hydrocarbon fractions which I have prepared and analyzed usually have a wide boiling range of from about 150° to over 450° C., density of about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight), maleic anhydride values of about 30 to about 90 (usually in the range of about 45 to 85), acid number below 3, average number of olefinic double bonds per molecule varying between about 2.5 and about 4, of which from about 40 to about 70 per cent are conjugated, and average molecular weights from about 200 to about 400, although the usual average is in the neighborhood of 300. Unsaturated hydrocarbon fractions derived from hydrogen fluoride sludges have also been prepared in which some of the hydrocarbons have molecular weights of as low as about 150 to as high as about 1000. Although hydrogen to carbon atomic ratios of the hydrocarbons contained in the unsaturated hydrocarbon fraction vary somewhat depending upon the particular source of the material, for a fraction derived from a polymer gasoline-hydrogen fluoride sludge they range from about 1.67 to about 1.72 (for the various fractions) with the actual weight percentages of hydrogen varying from about 12.35 to about 12.6.

The properties of the unsaturated hydrocarbon products will, of course, vary somewhat depending upon whether the entire boiling range of material or a specific fraction is obtained for analysis. In general, the lower boiling fractions have similar properties and are water-white to straw-yellow in color, while the higher boiling fractions are generally somewhat darker and may vary more in properties, with differences in charge stock, conditions of preparation, etc. In some cases, distillate fractions of the product may be more desirable and when these are separated, the distillation may be conducted under vacuum, with steam, or at atmospheric pressure.

The methods heretofore employed for the recovery of the unsaturated hydrocarbons contained in hydrogen fluoride sludges have, as indicated previously, relied upon either the expensive aqueous hydrolysis procedure or the ruinous thermal decomposition method. The conditions under which these methods are operated and the properties of the products recovered are indicated in Table I below:

TABLE I

*Non-catalytic decomposition of a hydrogen fluoride sludge*

| Method of Recovery | Aqueous Hydrolysis | Atmospheric Distn. | | | Vacuum Distn. | |
|---|---|---|---|---|---|---|
| Charge, g. sludge | | 1275 | | | 544 | |
| Fraction number | | 1 | 2 | 3 | 1 | 2 |
| Max. still pot temperature, °C | | 121 | 149 | 176 | 138 | |
| Pressure, mm. Hg absolute | 760 | 1,270 | 760 | 760 | 90 | 102 |
| Time, hours | | 21.8 | 25.8 | 27.8 | 11.75 | 29.75 |
| Per cent Hydrogen fluoride recovered [2] | ([1]) 0 | 45.3 | 5.5 | Trace | 31.2 | 11.6 |
| Purity of hydrogen fluoride recovered (per cent HF) | ([1]) | | 99 | | | |
| Per cent Still bottoms recovered | 42.2 | 51.6 | 46.1 | 45.2 | 68.8 | 57.1 |
| Properties of Recovered Hydrocarbons: [3] | | | | | | |
| Molecular weight | 290 | 345 | 369 | 372 | 308 | 362 |
| Bromine number | 181 | 103 | 91 | 78 | 158 | 149 |
| Diene number | 82 | 2 | 5 | 5 | 53.5 | 8.3 |
| $d_4^{20}$ | 0.859 | 0.884 | 0.896 | 0.897 | 0.890 | 0.881 |
| $n_D^{20}$ | 1.4846 | 1.4919 | 1.5023 | 1.5029 | 1.5037 | 1.4912 |
| Gardner color | 11–12 | 16–17 | >18 | >18 | >18 | >18 |

[1] No free hydrogen fluoride, hydrolysis with alkali.
[2] Weight per cent of total hydrogen fluoride in sludge.
[3] Residue in still pot after caustic wash.

The data shows that the distillation method of recovery in which the charge is subjected to relatively long periods of heating at elevated temperatures has a deleterious effect on the recovered unsaturated hydrocarbons. These extended periods of contact between the unsaturated hydrocarbons released by the thermal decomposition of the sludge with the free hydrogen fluoride in the system (especially when the hydrocarbons are refluxed in the presence of the hydrogen fluoride) causes polymerization and condensation of the unsaturated hydrocarbons to such an extent that the ultimate hydrocarbon product recovered, rapidly decreases in diene number as the contact period between the hydrocarbons and free hydrogen fluoride increases. Curve A, Figure 1, indicates the deleterious effect of reflux upon the hydrocarbons present in the still bottoms and recovered by aqueous hydrolysis, the effect being shown by an increase in the percentage reduction in diene number of the recovered hydrocarbons as the percentage of total hydrogen fluoride recovered overhead increases. The experimental points, in general, fall on or in the region of a single curve, indicating the interdependence of the two factors.

Table II, below presents data indicating the generally improved results obtainable by the catalytic decomposition of hydrogen fluoride sludges according to the method of the present invention.

TABLE II

*Catalytic decomposition of a hydrogen fluoride sludge*

| Catalyst or packing material | Carbon Rings | Aluminum Rivets | | Copper Raschig Rings | Brass [1] Turnings | Brass [2] Turnings | Magnesium Turnings | Cobalt Pellets | Cadmium Turnings | Lead Turnings | Tin Turnings |
|---|---|---|---|---|---|---|---|---|---|---|---|
| Feed rate, lbs./hr./gal. of packing | 8.3 | 7.8 | 10.0 | 6.5 | 6.7 | 7.5 | 8.4 | 4.2 | 5.9 | 7.2 | 6.7 |
| Temp. of catalyst packing, °C | 118 | 80 | 105 | 119 | 126 | 124 | 128 | 130 | 124 | 128 | 131 |
| Corrosion resistance of packing | Excellent | Poor | | Excellent | | | | good | good | poor | poor |
| Product Recovery: | | | | | | | | | | | |
| Unsaturated hydrocarbons [3] | 30.5 | 30.3 | 23.5 | 29.2 | 40.7 | 42.4 | 40.5 | 35.7 | 43.4 | 31.0 | 29.5 |
| Hydrogen fluoride [4] | 86.5 | 48.5 | 97.1 | 98.7 | 98.6 | 88.6 | 84.9 | 99.9 | 96.0 | 99.2 | 99.4 |
| Acidity [5] of hydrogen fluoride, recovered overhead, percent | 96.2 | 95.5 | 86 | 98.5 | 98.2 | 96 | 90.6 | 91.8 | 95.3 | 82.3 | 77.1 |
| Properties of Hydrocarbons recovered: | | | | | | | | | | | |
| Bromine number | 172 | 206 | 142 | 179 | 178 | 203 | 153 | 188 | 148 | 162 | 159 |
| Diene number | 30.4 | 82.5 | 28 | 47.2 | 62 | 40.9 | 37 | 53 | 37 | 65 | 50 |
| Gardner color | 17 | 16 | 18 | 18 | 17 | 18 | 18 | 15 | 16–17 | 17 | 11 |

[1] Composition of brass: 63% Cu, 0.75% Pb, 36.25% Zn.
[2] Composition of brass: 60.0% Cu, 0.75% Sn, 39.25% Zn.
[3] Weight percent of sludge charged.
[4] Weight percent of hydrogen fluoride charged.
[5] Difference between 100% and given acidity comprises hydrocarbons flashed overhead with the hydrogen fluoride.

Not only are the recovered hydrocarbons of higher diene number (approaching the value of hydrocarbons recovered by the aqueous hydrolysis method) but the hydrogen fluoride recovered in the same operation is of high concentration suitable for immediate recycling to the principal conversion process. The table presents but a few of the metallic elements and alloys which may be employed and gives in a general way the character of the products recovered in the operation of the present process.

The results obtained by the catalytic method of sludge decomposition, herein disclosed, are shown in curves B and C (for aluminum and copper respectively) of Figure 1 where the diene number of the recovered hydrocarbons is plotted against the percentage of hydrogen fluoride recovered overhead from the decomposition process. The curves clearly indicate in graphic representation that the diene number of the recovered hydrocarbons is inversely proportional to the percentage of hydrogen fluoride recovered. In comparing the curves for decomposition in the presence of a catalyst with the decomposition by thermal distillation (curves B and C against curve A in Figure 1), it is apparent that the catalytic decomposition process makes possible the recovery of hydrocarbons having a much higher degree of conjugated unsaturation (shown by the diene number) for a given percentage recovery of hydrogen fluoride.

The unsaturated polyolefinic hydrocarbons containing conjugated and non-conjugated unsaturation recovered according to the present process have a special field of utility in the manufacture of drying oils, paints, varnishes, lacquers, shellac substitutes and other protective coatings and for this purpose they may be mixed with varying proportions of natural glyceride drying oils or utilized independently in the composition of said products. Besides being a particularly desirable drying oil, the product of the present process may be utilized in the preparation of resins and plastics and a variety of synthetic organic compounds. For example, the hydrocarbons may be condensed with dienophilic acid anhydrides such as maleic, itaconic and mesaconic acid anhydrides (or other derivatives) to form higher molecular weight acids or derivatives thereof. Such acids may be esterified or amidized to form resinous and plastic materials or other intermediates. The unsaturated properties of these hydrocarbons renders them suitable for halogenation to form halogen derivatives thereof from which insecticidal compositions may be prepared. Further, these hydrocarbons may be converted to derivatives of a variety of inorganic compounds for the preparation of detergents, siccatives, etc.

The following examples are introduced for the purpose of illustrating the results obtainable by the process of the present invention, but they should not be construed so as to limit the scope of the invention disclosed herein or claimed in the following claims.

EXAMPLE I

A hydrogen fluoride sludge was prepared by the following series of steps: The hydrocarbon charging stock was a codimer naphtha fraction having the following properties:

Engler distillation:
    Initial boiling point, °C. _____ 45
    10% _____ 96
    30% _____ 113
    50% _____ 120
    70% _____ 140
    90% _____ 203
    End boiling point _____ 256

Two liters of the above naphtha were gradually added under pressure and with stirring to 800 grams of anhydrous hydrogen fluoride. Stirring was continued for one hour at a temperature of from about 90 to about 95° C. followed by cooling the reactor and its contents to approximately 0° C. in an ice bath. The liquid products separated into two layers on standing, an upper hydrocarbon phase which was removed and washed with a dilute solution of sodium hydroxide and a lower layer, containing substantially all of the hydrogen fluoride charged to the reaction. The latter layer was decanted from the reactor and reserved for subsequent treatment as below. It containing approximately 57% of hydrogen fluoride (practically all believed to be in a combined state) and 43% of hydrocarbon.

EXAMPLE II

A sludge prepared as in Example I was fractionally distilled in a still fabricated from copper comprising a flask having an attached tube of approximately one inch diameter packed with steel jack chain as the fractionating column. The still head temperature was such as to maintain a reflux of liquid hydrogen fluoride, while the pressure was varied to obtain a reasonable distillation rate. The results obtained at various pressures and temperatures of operation are summarized in Table I above and in the accompanying graph of Figure 1, curve A.

EXAMPLE III

A sludge prepared as in Example I was catalytically decomposed under flash separation conditions by pumping it into an externally heated stainless steel reactor tube packed with various catalysts and maintained at atmospheric pressure. The hydrogen fluoride and other light vapors which flashed overhead were condensed by refrigeration. The heavy hydrocarbon bottoms separating in the column, were collected directly under dilute caustic to neutralize any residual acidity in the hydrocarbons. The results obtained with various catalysts and the conditions employed are shown in Table II above.

EXAMPLE IV

A spent hydrogen fluoride catalyst sludge obtained from a commercial plant for the alkylation of isobutane with cracked refinery gases containing propylene and butylene was analyzed and found to be of 83.2% acidity. This sludge was charged to the reactor of Example III, packed with the leaded brass catalyst described in Table II at a rate of 8 pounds per hour per gallon of catalyst space with the reactor maintained at a temperature of 120° C. An acid recovery of 99.8% was obtained, the recovered acid being of 99.4% acidity, a purity which is highly satisfactory for further use in alkylation. The polyenic hydrocarbon bottoms recovered had a bromide number of 172, a maleic anhydride value of 56, and they dried on exposure to air in a thin film to form a hard varnish-like coating.

I claim as my invention:

1. A process for catalytically resolving a hydrogen fluoride sludge into substantially anhydrous hydrogen fluoride and a hydrocarbon product which comprises passing said sludge at a decomposition temperature and pressure over a metallic decomposition catalyst comprising at least one metal selected from the group consisting of tin, lead, aluminum, chromium, zinc, nickel, iron, silver, antimony, cobalt, copper, magnesium, bismuth, tungsten and cadmium, and separating the resultant products into an overhead vaporous fraction comprising said substantially anhydrous hydrogen fluoride and a liquid bottoms fraction comprising said hydrocarbon product containing polyenic hydrocarbons having conjugated and non-conjugated unsaturation.

2. A process for the catalytic decomposition of a hydrogen fluoride sludge which comprises passing said sludge at a decomposition temperature and pressure over a metallic decomposition catalyst comprising at least one metal selected from the group consisting of tin, lead, aluminum, chromium, zinc, nickel, iron, silver, antimony, cobalt, copper, magnesium, bismuth, tungsten and cadmium, and separating the resultant products into a first fraction containing a major proportion of hydrogen fluoride and a second fraction containing a major proportion of polyenic hydrocarbons having conjugated and non-conjugated unsaturation.

3. A process for the catalytic decomposition of a hydrogen fluoride sludge which comprises passing said sludge at a decomposition temperature and pressure over particles of metallic lead and separating the resultant products into a first fraction containing a major proportion of hydrogen fluoride and a second fraction containing a major proportion of polyenic hydrocarbons having conjugated and non-conjugated unsaturation.

4. A process for the catalytic decomposition of a hydrogen fluoride sludge which comprises passing said sludge at a decomposition temperature and pressure over a metallic decomposition catalyst comprising copper and separating the resultant products into a first fraction containing a major proportion of hydrogen fluoride and a second fraction containing a major proportion of polyenic hydrocarbons having conjugated and non-conjugated unsaturation.

5. A process for the catalytic decomposition of a hydrogen fluoride sludge which comprises passing said sludge at a decomposition temperature and pressure over a brass decomposition catalyst containing from about 50 to about 75% copper, from about 20 to about 40% zinc, and from about 0.25 to about 10% lead, and separating the resultant products into a first fraction containing a major proportion of hydrogen fluoride and a second fraction containing a major proportion of polyenic hydrocarbons having conjugated and non-conjugated unsaturation.

6. A process for the catalytic decomposition of a hydrogen fluoride sludge which comprises passing said sludge at a temperature within the range of from about 50° to about 200° C., at substantially atmospheric pressure over a metallic decomposition catalyst comprising at least one metal selected from the group consisting of tin, lead, aluminum, chromium, zinc, nickel, iron, silver, antimony, cobalt, copper, magnesium, bismuth, tungsten and cadmium, and separating the resultant products into a first fraction containing a major proportion of hydrogen fluoride and a second fraction containing a major proportion of polyenic hydrocarbons having conjugated and non-conjugated unsaturation.

7. A process for the catalytic decomposition of a hydrogen fluoride sludge which comprises passing said sludge at a super-atmospheric pressure and at a decomposition temperature within the range of from about 50° to about 200° C. into a catalytic reactor maintained at atmospheric pressure containing a metallic decomposition catalyst comprising at least one metal selected from the group consisting of tin, lead, aluminum, chromium, zinc, nickel, iron, silver, antimony, cobalt, copper, magnesium, bismuth, tungsten and cadmium, and separating the resultant decomposition products into an overhead vaporous fraction comprising substantially anhydrous hydrogen fluoride and a liquid bottoms fraction comprising polyenic hydrocarbons having conjugated and non-conjugated unsaturation.

HERMAN S. BLOCH.

REFERENCES CITED

The following references are of record in the file of this patent:

UNITED STATES PATENTS

| Number | Name | Date |
| --- | --- | --- |
| 2,333,649 | Grosse | Nov. 9, 1943 |
| 2,371,341 | Matuszak | Mar. 13, 1945 |
| 2,378,636 | Iverson | June 19, 1945 |
| 2,400,521 | Kuhn | May 21, 1946 |